United States Patent
Kaminski et al.

(10) Patent No.: US 6,339,268 B1
(45) Date of Patent: Jan. 15, 2002

(54) COOLING VENTILATION CIRCUIT FOR ROTOR END WINDING AND SLOT END REGION COOLING

(75) Inventors: Christopher Anthony Kaminski, Niskayuna; Emil Donald Jarczynski, Scotia; William H. Boardman, Burnt Hills; James Michael Fogarty, Schenectady, all of NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/496,727

(22) Filed: Feb. 2, 2000

(51) Int. Cl.[7] .............................. H02K 9/00; H02K 1/32
(52) U.S. Cl. ................................. 310/61; 310/59
(58) Field of Search ........................ 310/61, 52–60, 310/62–66

(56) References Cited

U.S. PATENT DOCUMENTS

| | | | |
|---|---|---|---|
| 1,927,890 A | | 9/1933 | Fechheimer ................... 310/61 |
| 2,787,721 A | | 4/1957 | Tudge ........................... 310/61 |
| 2,833,944 A | | 5/1958 | Willyoung ..................... 310/61 |
| 4,315,172 A | * | 2/1982 | Intichar et al. ................ 310/53 |
| 4,363,982 A | * | 12/1982 | Kaminski ....................... 310/61 |
| 4,543,503 A | | 9/1985 | Kaminski et al. .............. 310/59 |
| 4,709,177 A | | 11/1987 | Kaminski et al. .............. 310/59 |
| 4,814,655 A | * | 3/1989 | Kaminski ...................... 310/260 |
| 5,103,552 A | * | 4/1992 | Fogarty et al. ................ 29/596 |
| 5,189,325 A | * | 2/1993 | Jarczynski ..................... 310/54 |
| 5,281,877 A | * | 1/1994 | Kazmierczak et al. ........ 310/59 |
| 5,644,179 A | * | 7/1997 | Staub et al. ................... 310/65 |
| 5,652,469 A | * | 7/1997 | Boardman et al. ............ 310/58 |
| 5,929,550 A | * | 7/1999 | Kaminski et al. ............ 310/214 |

* cited by examiner

Primary Examiner—Nestor Ramirez
Assistant Examiner—Guillermo Perez
(74) Attorney, Agent, or Firm—Nixon & Vanderhye PC (57) ABSTRACT

A cooling gas ventilation circuit is provided for an end winding of a rotary machine having a rotor of the type having a plurality of radial slots and a plurality of coils respectively seated in the radial slots, the coils extending beyond a pole face of the rotor to form the end winding. The ventilation circuit is composed of first and second cooling gas passages, respectively defined in at least one turn of each coil of the end winding. Each first cooling gas passage extends from an inlet port in communication with a cavity on one longitudinal side of the turn to an exit port defined on the other longitudinal side of the turn. Each second cooling gas passage extends from an inlet port in communication with the cavity on the one longitudinal side of the turn to an outlet in the form of a radial chimney defined through a plurality of the turns of the coil within the respective radial slot. In the presently preferred embodiment, the second passage is longitudinally offset in the coil structure with respect to the first cooling passage, so that they serve to cool respective portions of the coil. The passages may be but are not necessarily defined in the same turn of their respective coil.

16 Claims, 5 Drawing Sheets

COOLING VENTILATION CIRCUIT FOR ROTOR END WINDING AND SLOT END REGION COOLING

BACKGROUND OF THE INVENTION

This invention relates generally to the rotor windings of a dynamo-electric machine, and more particularly, to rotor and rotor end winding cooling in machines with concentric rotor windings.

The rotors in large gas cooled dynamo-electric machines have a rotor body which is typically made from a machined high strength solid iron forging. Axially extending radial slots are machined into the outer periphery of the rotor body at specific circumferential locations to accommodate the rotor winding. The rotor winding in this type of machine typically consists of a number of complete coils, each having many field turns of copper conductors. The coils are seated in the radial slots in a concentric pattern with, for example, two such concentric patterns in a two-pole rotor. The coils are supported in the rotor body slots against centrifugal forces by wedges which bear against machined dovetail surfaces in each slot. The regions of the rotor winding coils which extend beyond the ends of the main rotor body are called "end windings" and are supported against centrifugal forces by high strength steel retaining rings. The inboard end of each retaining ring is typically shrunk onto a machined surface at the end of the rotor body and the outboard end of each retaining ring is typically shrunk onto a circular steel centering ring. The section of the rotor shaft forging which is disposed underneath the rotor end windings is referred to as the spindle. For ease of reference and explanation hereinbelow, the rotor winding can be characterized has having a slot end region within the radial slots at the end of the rotor body, and a rotor end winding region that extends beyond the pole face, radially spaced from the rotor spindle. This invention relates primarily to the cooling of the slot end region and of the rotor end winding region.

In generator rotor designs with Diagonal Flow and Radial Flow cooling, the rotor end windings are generally the hottest part of the field winding because these regions are difficult to cool effectively. Heat is difficult to remove because the mechanical structure that supports the end winding under high centrifugal loads inhibits the placement of cooling passages, lest the mechanical integrity of the support system be compromised. Consequently, rotor end windings are cooled either passively (sometimes referred to as "free convection") or by forced convection, which introduces cooling gas directly into long passages in the copper field turns. Passive cooling systems, while simple in construction, have inherently low heat transfer effectiveness. The forced convection passages carry cooling gas longitudinally along the copper field turn for significantly long distances until the hot gas can be discharged into the air gap (i.e., the gap between the rotor and stator) through holes in the wedges in the main body section of the rotor, inboard of the retaining ring support structure. The transport temperature rise of the cooling gas causes the gas to be less effective in removing heat as it progresses along these long passages. In fact, the cooling gas entrapped in long passages can reach a temperature where it can no longer maintain the copper conductors within required thermal limits. In such cases, a second set of cooling grooves may be introduced at an intermediate point along the length of the copper field turn; either in the same turn if space and current carrying capacity allows, or in alternative layers of the copper turns. An example of such a cooling scheme is disclosed in U.S. Pat. No. 4,709,177, the entire disclosure of which is incorporated herein by this reference. In this configuration, some turns have long full-length passages while others have the shorter passages whose entrance ports are closer to the discharge. In either case, the hot gas is transported through the entire length of the long passage, resulting in locally elevated operating temperatures in the region approaching the discharge holes. Therefore, there is a need for a more effective cooling scheme in the end regions of electrical generator rotors.

Thus, several previous attempts at reducing hot spot temperatures in field windings have been made. Early attempts included drawing in gas from the ends of the rotor between the coils and discharging it through vent slots in the teeth. The large spacing between coils made this form of cooling relatively ineffective. Later schemes involved directing gas through long channels in the copper and discharging them through a chimney in the body section of the rotor. However, these suffer from the need for long ducts, as described above. As the gas flows along the channel, it picks up heat and becomes less effective at reducing local copper temperature. This introduces a practical limit to how long the grooves can be.

BRIEF SUMMARY OF THE INVENTION

To address the deficiencies of the prior art cooling/ventilating schemes, shorter, independent cooling passages are provided in the slot end region. This lowers the rotor field winding operating temperature and makes it more uniform. To provide for these shorter independent cooling passages, the hot end winding gas is discharged into passages or channels between the windings for discharge. Most preferably, the discharged hot end winding gas is directed via cavities in body support blocks to vent slots or holes in the rotor teeth, thereby to define a substantially uninterrupted flow path from the end winding grooves to the air gap between the stator and rotor. Routing the cooling gas through such support blocks provide an additional, parallel flow path from the end grooves to the air gap which increases the cooling capacity of the end winding. Thus, the slot end region of the copper turns can be ventilated independently from the end winding by providing a second groove which introduces the cold gas just inboard of the end turn discharge ports.

Thus, the rotor end winding cooling scheme of the invention ventilates the slot end region of the turns separately from the coil end region. This reduces the length of the individual ventilation ducts in the conductors which will in turn reduce hot spots in the rotor winding. Vent slots in the rotor teeth may be used to discharge the hot coil side gas.

In its broadest respects, therefore, the present invention relates to a cooling gas ventilation circuit for an end winding of a rotary machine having a rotor, and a plurality of coils seated in radial slots provided in the rotor, the coils each comprising a plurality of radially stacked turns, the coils extending beyond a pole face of the rotor to form an end winding. The ventilation circuit is composed of first and second cooling gas passages, each respectively defined in at least one turn of each coil of the end winding. Each first cooling gas passage extends from an inlet port in communication with a cavity on one longitudinal side of the turn to an exit port defined on the other longitudinal side of the turn. Each second cooling gas passage extends from an inlet port in communication with the cavity on the one longitudinal side of the turn to an outlet in the form of a radial chimney defined through a plurality of the turns of the coil within the respective radial slot. In the presently preferred embodiment, the second passage is longitudinally offset with respect to the first cooling passage, so they serve to cool respective portions of the coil. The first and second passages may be but are not necessarily defined in the same turn of their respective coil.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
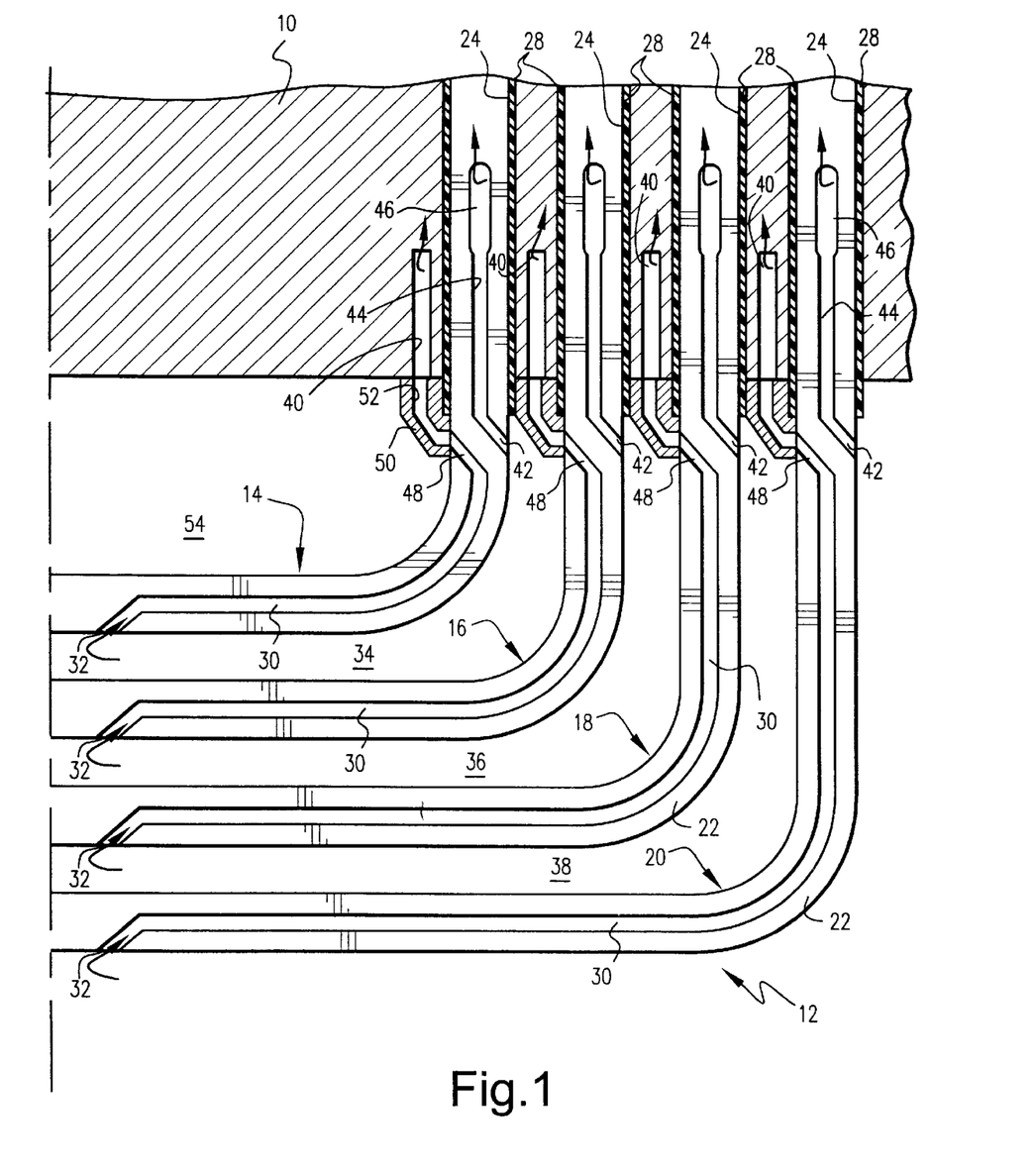
FIG. 1 is a partial top plan view, partially sectioned, of the turns of end winding at one end of the rotor in a first embodiment of the invention.
Figure 2:
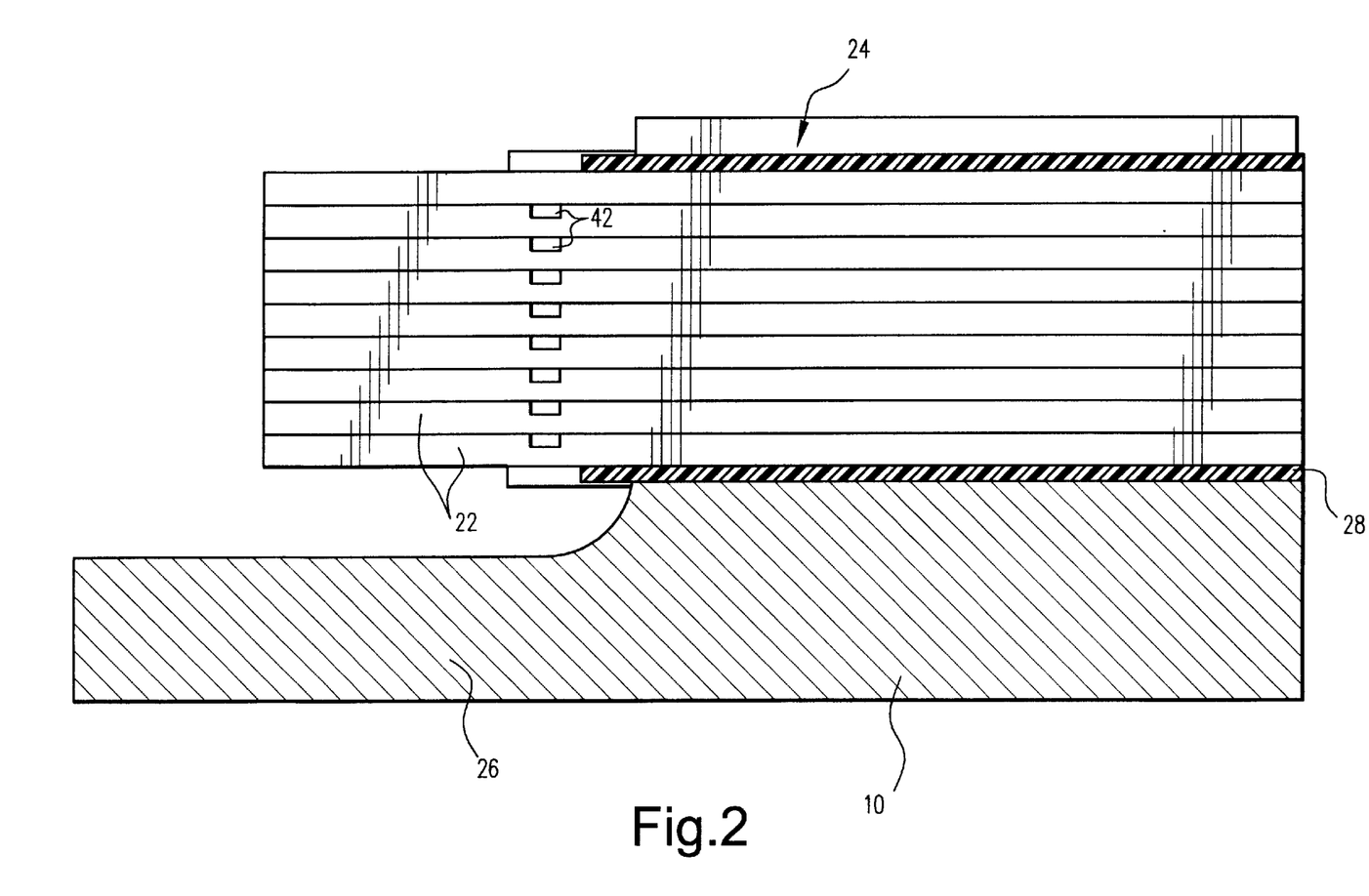
FIG. 2 is a radial axial view of on side of a stack of copper turns of the rotor end winding of the FIG. 1 embodiment.

With reference to FIG. 1, one end of a rotor body 10 is illustrated with a rotor end winding 12 extending beyond one end of the rotor body. The rotor end winding includes the end region of a number of complete coils 14, 16, 18 and 20 in a concentric, generally rectangular configuration. For a two pole rotor, two such concentric sets of coils are arranged on opposite sides of the rotor. The invention is applicable, however, to other rotor configurations as well. Each coil includes many field turns 22 of copper conductors in a stacked configuration. These coils are nested within the radial slots 24 machined into the outer periphery of the rotor body, with the end windings extending axially beyond the rotor body at both ends of the machine in conventional fashion. A spindle portion 26 of the rotor extends in an axial direction, radially inward of the end winding. The coils 14, 16, 18 and 20 are supported in the slots 24 of the rotor body against centrifugal forces by metallic wedges (not shown) which bear against machined dovetail surfaces (not shown) in each rotor coil slot. The rotor winding is electrically insulated from the rotor body via appropriate slot armor 28. In addition, the turns which make up the coils of the rotor winding are electrically insulated from each other via appropriate turn-to-turn insulation. For the sake of simplicity, the insulation is not shown in the drawings. Note also that in FIG. 1, one half of the end winding 12 is shown in simplified form. Spacer blocks that are normally present in the end winding to separate the coils 14, 16, 18 and 20 have been eliminated for clarity.

Cooling gas passages are formed to extend along at least a portion of the length of at least one turn of at least one coil of the end winding. In the exemplary embodiment of the invention illustrated in FIG. 1, the cooling gas passages include first cooling gas passages defined by grooves 30 machined on the upper, and/or lower, radial face of some or all of the turns to allow cooling gas to enter respective ports 32 on one longitudinal side of the turns and to exit into the cavities 34, 36, and 38 between the coils 14 and 16, 16 and 18, and 18 and 20, respectively, on the other longitudinal side of the turns. The turns of the coils in some rotors are formed from multiple layers. In such structures, cooling gas passages for the purposes described herein may be defined by grooves in the upper and/or lower radial faces of one or more of the layers of one or more of the turns.

Vent passages 40 (FIG. 1), such as curved vent slots are machined in the rotor body "teeth" (the solid portions between the radial slots 24 at the axial end of the rotor body, also referred to herein as the pole face). This allows the cooling gas that exits grooves 30 to flow via slots 40 into the annular air gap between the machine's stator (not shown) and the rotor body 10. It will be appreciated that the curved vent slots 40 may be replaced by combinations of axially and radially extending holes. Some or all of the turns in coils 14, 16, 18 and 20 also have second cooling gas passages defined in the illustrated embodiments by longitudinal grooves 44 extending from holes or ports 42 close to the pole face to radial chimneys 46 within the rotor body 10 that are formed, e.g., by punching the turns 22. As can be seen, cooling gas grooves 44 are longitudinally offset from grooves 30, so that the act to cool respective portions of the turn(s).

In a known manner, some of the cooling gas also flows axially within a sub-slot (not shown) in the rotor body that, in turn, communicates with additional radial chimneys (not shown) formed in the coils at axially spaced locations along the rotor body. Note that in the presently preferred embodiment, chimneys 46 do not connect with the sub-slot (not shown), but the chimneys axially inboard thereof are connected to the sub-slot. Thus, in the presently preferred embodiment, chimneys 46 receive cooling gas only via grooves 44 in the field turns of the coils.

The flow of cooling gas into slots 40 and through the cooling gas grooves 44 and chimneys 46 cools the transition section of the rotor and the coils between the end winding 12 and the rotor body 10, referred to herein above as the sot end region. The cooling of the rotor body 10 itself can be achieved by any compatible method such as radial cooling (or axial/radial cooling) via cooling gas fed from sub-slots machined under the main coil slots in the rotor body, or any gap pickup body cooling scheme where cooling gas enters and discharges from the machine's air gap.

When the machine is running at rated speed, the pumping head of the machine's rotor drives the cooling gas flow through the passages. The cooling gas flow distribution within the passages can be controlled via sizing of the ports, sizing of the punched holes in the turns which form the radial chimneys, sizing of the grooves, and the radial/axial alignment of the turns to insure that each turn in the section of the rotor end winding of interest is ventilated properly.

One of the appealing features of the configuration illustrated in FIG. 1 is that each cavity space between adjacent coils has its own set of 'exhaust' ports 42 to feed slot or groove 44. This provides for effective and uniform cooling of each of the coil side cavities 34, 36, and 38 with none of the coil side cavities left unvented. Thus, providing ports 42 for every cavity actively relieves hot pockets of trapped gas that might otherwise exist for unvented cavities, other than the limited gas exchanged from passively cooled trapped cavities. In addition, when a single set of exhaust ports are provided per cavity, the flow pattern and flow distributions are more predictable and uniform which helps make the design more robust. It is to be noted and understood in this regard that gas flowing through the cavity on its way to port 42 additionally cools the sides of the copper coils and thus provides cooling in addition to that provided by gas flowing through grooves 30 and 44.

As mentioned above and illustrated in FIG. 1, first gas passages or grooves 30 are defined in the radially upper and/or lower face of the copper turns of the coils. The ventilating/cooling gas inlet port for cooling the end winding region is schematically shown in at 32. To encourage flow through and along the respective grooves, it can be seen that the inlet ports are inclined with respect to the exposed longitudinal side face of the turns, in this case also corresponding to the axial end face of the assembly. It is to be understood, however, that as an alternative to an inclined port, one or more of the inlet ports could be disposed perpendicular to the direction in which the groove 30 extends. In the illustrated embodiment a single groove extends along each half end winding to discharge through discharge port 48. Again, to facilitate un-impeded flow, the exit or discharge port 48 is preferably inclined with respect to the side face of the respective copper turn. In the alternative, one or more of the exit ports may be disposed perpendicular to the side face of the turn. In the absence of flow directing structure, discussed below, the exit ports will discharge the end winding ventilating gas into the cavities intermediate the coils. As described above, slots or holes 40 are defined in the rotor teeth for directing the end winding gas, e.g., to the gap between the rotor and the stator (not shown). In the presently preferred embodiment of the invention, to ensure that the coil end winding ventilating gas flows substantially directly to and into the ventilating slot(s) in the respective rotor tooth, ventilated body blocks 50 are provided to intercept flow from the exit ports 48 of the copper turns. Thus, each ventilated block 50 acts as a manifold for intercepting and directing this flow to the slots or holes in the rotor teeth.

Figures 3, 5:
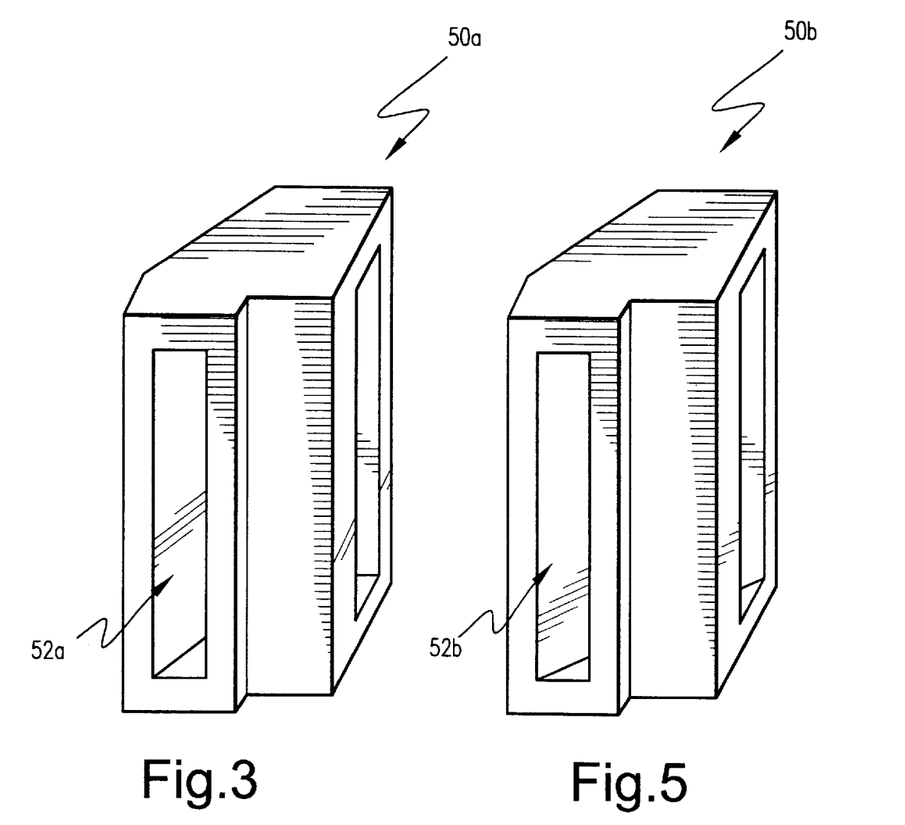
FIG. 3 is an isometric view of a first embodiment of a ventilated body block according to the invention.
FIG. 5 is an isometric view of a second embodiment of a ventilated body block according to the invention.
Figure 4:
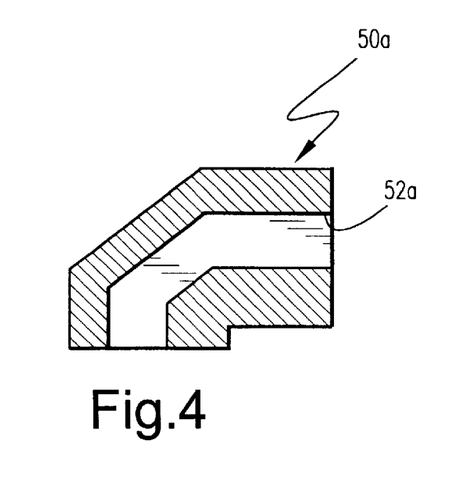
FIG. 4 is a cross-sectional view of the ventilated body block of FIG. 3.

FIGS. 3 and 4, respectively are isometric and cross-sectional views of a ventilated body block 50a according to one embodiment of the invention, having a generally curved flow passage 52a.

Figure 6:
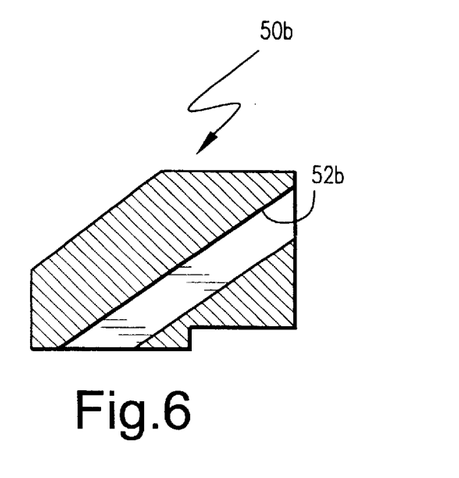
FIG. 6 is a cross-sectional view of the ventilated body block of FIG. 5.

FIGS. 5 and 6 illustrate an alternate embodiment of a ventilated body block 50b. As can be seen, this embodiment differs from the embodiment of FIGS. 3 and 4 in that the flow passage 52b is generally straight. While the particular configuration of the flow passage 52 through the ventilated block 50 is not critical to the implementation of the invention, it is to be understood that it is preferred for the passage(s) 52 defined through the ventilated body block be adapted to intercept the flow exiting the exit ports 48 and encourage its unimpeded flow to the slots or holes 40 in the rotor teeth for discharge to the air gap.

The ventilated body blocks described above are provided for the purpose of isolating the hotter gas feeding the ventilation slots in the teeth from the cooler gas entering the next adjacent coil in the same vicinity. Thus, any leakage in the block is to be avoided as it will reduce the effectiveness of the cooling. The above-described two exemplary forms of the block solve this problem but provide for a relatively complex block construction.

The embodiment of FIG. 1 shows all of the ports 48 coming from the right hand side, to open at the left face of the turns. As an alternative, these ports can all be defined as coming from the left hand side. With this alternate configuration, the cavity 54 at the rotor pole body would be vented via the ports to the chimney 46 of coil 14, and there would be no need for a ventilation slot in the rotor pole. It is to be understood that other variations of blocking patterns can be adapted from this basic concept.

Figure 7:
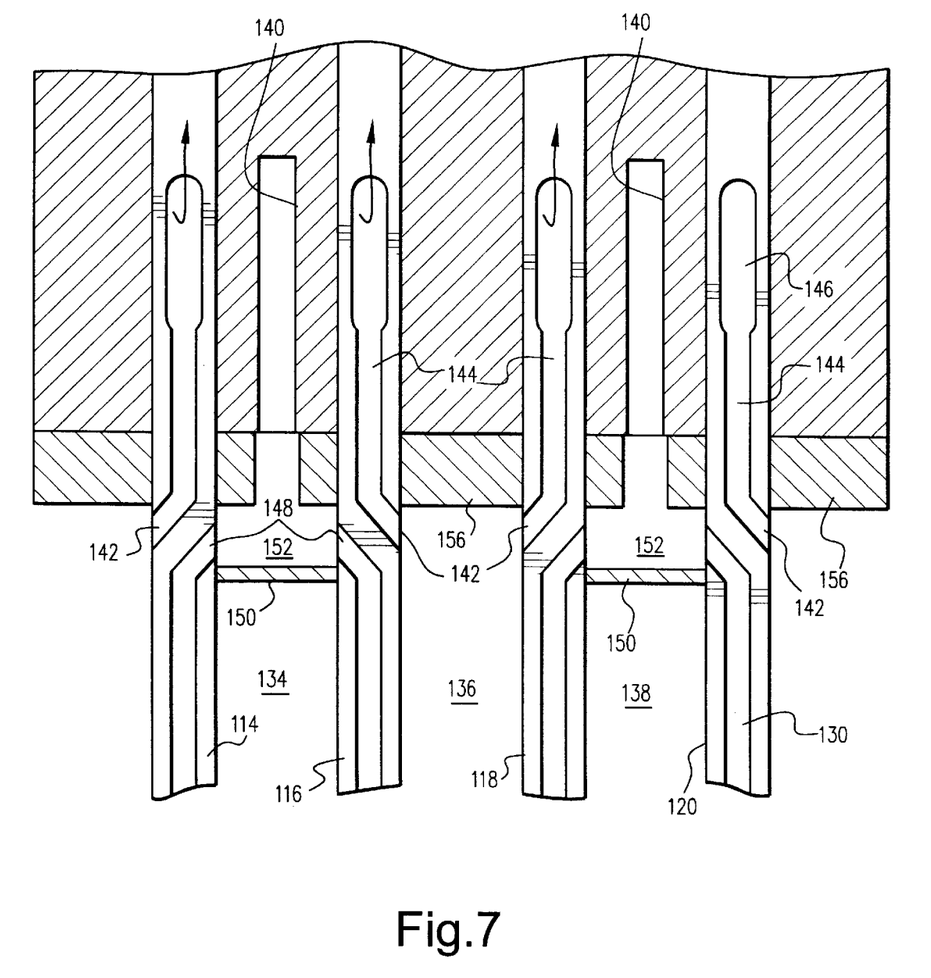
FIG. 7 is a partial top plan view, partially sectioned, of the turns of a rotor end winding at one end of the rotor in accordance with an alternate embodiment of the invention.

The first embodiment of the invention, described herein above, contemplates a ventilation slot 40 in every rotor tooth. In a rotor with seven 7 coils/poles, which is typical, there are 28 slots and thus 56 ventilation passages in the teeth are contemplated (28 in each end of the rotor) for the full implementation of this ventilation scheme. As can be appreciated, the ventilation passages will increase the amount of machining time needed to process the rotor forging and will increase the set ups and operations thus potentially increasing the likelihood of a machining error. Thus, an alternate embodiment of the invention adopts a simplified construction of the ventilated body block and eliminates half of the ventilation slots contemplated in the rotor teeth. With reference to FIG. 7, this alternate embodiment of the invention is accomplished by having the outlet ports 148 from two adjacent coils 114, 116 and 118, 120 feed a single ventilation slot 140 in the rotor teeth. Likewise, the inlet ports 142 for two adjacent coils draw gas from the same cavity, e.g. cavity 136, between the coils. With such a configuration, the ventilated body block 150 can now possess left to right symmetry and may be simplified as compared to the first embodiment. FIG. 7 shows, by way of example, the slot end region of four coils. Thus, whereas the first embodiment provided all of the inlet ports 42 on one side of the coil, the right side in the illustration of FIG. 1, and all of the end winding cooling groove outlet ports 48 on the opposite side, the left side of FIG. 1, the embodiment of FIG. 7 pairs inlet ports 142 of two adjacent coils and outlet ports 148 of other adjacent coils. With this arrangement, pairs of outlet ports 148 feed the same ventilation slot 140 in the rotor teeth thereby eliminating the need for slot in line with cavities 136 that feed the inlet ports 142. This isolation of the inlet ports from the outlet ports inherently eliminates the potential for hot gas leaking from one outlet port 148 and/or block 150 to the nearby inlet port.

In accordance with this embodiment of the invention, the body blocks between the coils now take two functions and forms. Those body blocks 156 adjacent the inlet ports 142 are now the same as the conventional spacer blocks and require no special machining. Those blocks 150 connecting the outlet ports 148 to the ventilation slots 140 in the teeth are now symmetric and the passage 152 therein can be formed by simple machining processes (drilling and milling).

As illustrated in FIG. 1 the first embodiment of the invention may require some machining in the rotor pole to form a ventilation slot or hole. This is because in at least two places in the rotor an outlet port 148 will feed into a ventilation slot that is on the same side of the coil 14 as the rotor pole. Thus, special steps would likely be required to machine the slots in the pole and suitable plates or other retention mechanism would be required to retain the ventilation block 50 in place at the outlet port 48. The arrangement of the embodiment of FIG. 7 eliminates the need for a ventilation passage in the rotor pole and the block that feeds it. More particularly, because all common rotors use an even number of coil slots on each side of the pole, it would always possible to place the required ventilation slots in the teeth between the slots. As a result, current blocking arrangements in the pole region already in use could be retained without change.

Thus, the arrangement of the second embodiment provides for an arrangement of inlet and outlet ports on the coils so as to eliminate the need for half of the ventilation slots in the rotor teeth, a simplification of the ventilated block to a more symmetrical form that may be easily machined, a reduction in the risk that hot gas from an outlet port will leak into an inlet port and elimination for the need for a ventilation slots in the rotor pole. However, as can be seen in FIG. 7, this embodiment leaves the coil side cavities 134 and 138 between the two grooves 130 unvented and has two grooves 144 drawing cooling gas from the same cavity 136. This configuration could thus tend toward non-uniform flow patterns, with trapped cavity and less effective surface area cooling. This also may introduce a leading side and trailing side (with respect to rotation) characteristic for exhaust ports 142. The leading and trailing characteristic tends to force flow preferentially to one side which may also may lead to nonuniform coolings for the adjacent coils.

Figure 8:
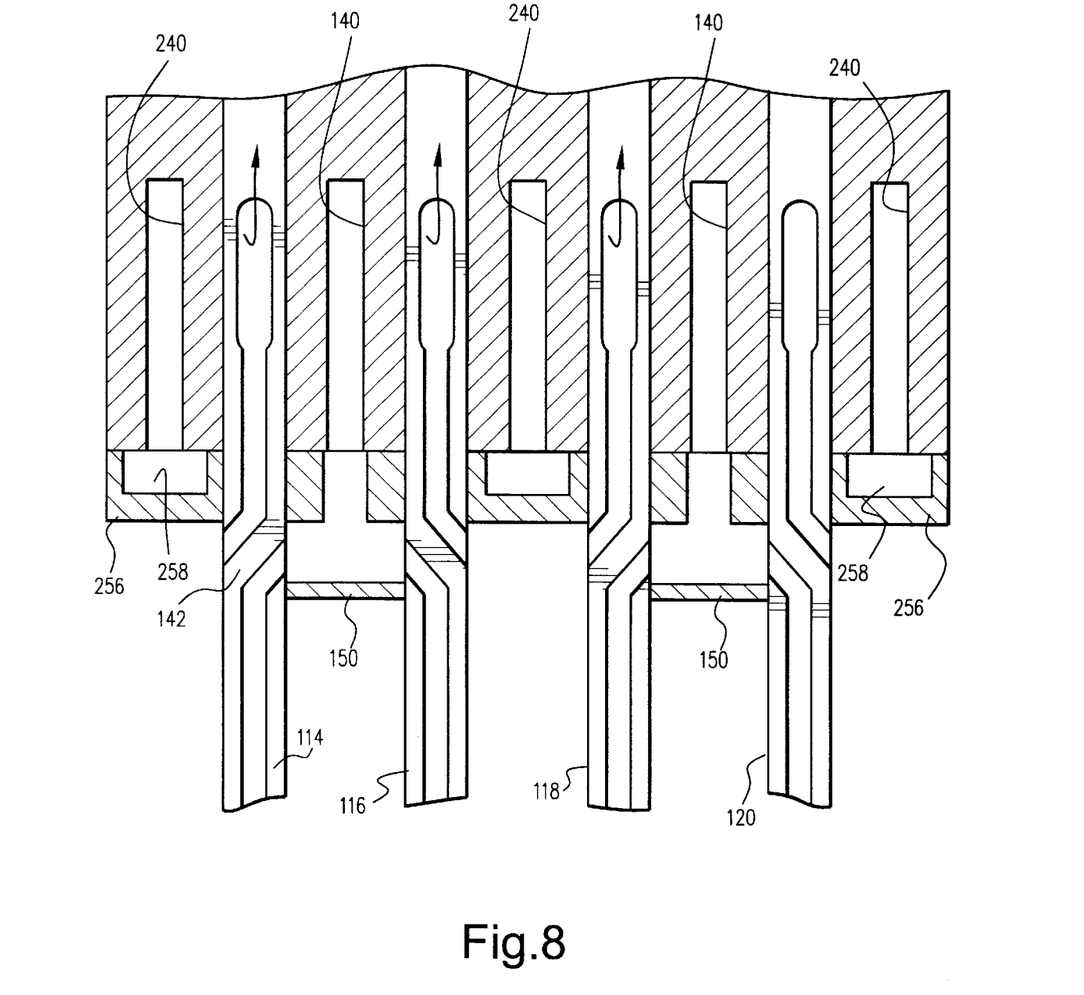
FIG. 8 is a view, similar to FIG. 7, of yet another alternate embodiment of the invention.

Yet another embodiment is illustrated in FIG. 8. This embodiment incorporates a vent slot 140 in every other tooth for discharge of the coil cooling gas passages 130 and further provides for a discharge of gas from beneath the coils through cavity 258 formed by a slot 240 in the tooth and ventilated body block 256 disposed adjacent the cavity exhaust/cooling passage inlet port 142. The remaining components of this embodiment correspond to those of the FIG. 7 embodiment and have been labeled accordingly. With this configuration, maximum use is made of every tooth in respect to providing for a uniform cooling of the rotor end and flow of ventilating gas.

While in the illustrated embodiments the end winding cooling passage, such as groove 30, and the slot end region cooling passage, such as groove 44, are both defined in the upper radial face of each turn of each coil, it is to be understood that these passages or grooves may be defined in either the upper or the lower face of the turn, or one in the upper face and one in the lower face of one or more turns. Furthermore, these grooves could be defined in alternating turns so that every other turn has a groove 30 and the remaining turns have a groove 44. Other suitable cooling passage configurations and combinations will be apparent to the skilled artisan from the foregoing examples.

The above described ventilation schemes can be employed on any machine with a concentric wound field winding of suitable turn dimensions with square corner and/or C-shaped corner construction, and can most readily be applied to two pole and four pole round rotor turbine driven generators. The cooling gas can be any suitable gas but is most typically air or hydrogen.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A cooling gas ventilation circuit for an end winding of a rotary machine having a rotor, a plurality of radial slots provided in said rotor, and a plurality of coils respectively seated in said radial slots, said coils each comprising a plurality of radially stacked turns, said coils extending beyond a pole face of the rotor to form an end winding, cavities being defined between adjacent pairs of said coils, said ventilation circuit comprising:

a first cooling gas passage defined in at least one turn of each said coil of said end winding, said first cooling gas passage extending from an inlet port in communication with the cavity on one longitudinal side of said turn to an exit port defined on the other longitudinal side of said turn, said first cooling gas passage extending along at least a portion of the longitudinal extent of said turn; and a second cooling gas passage defined in at least one turn of each said coil of said end winding, said second cooling gas passage extending from an inlet port in communication with said cavity on said one longitudinal side of said turn to a radial chimney defined through a plurality of the turns of the coil within said respective radial slot, said second passage being longitudinally offset with respect to said first cooling passage, wherein said rotor is formed with a vent passage extending from said pole face in an area of said rotor between said radial slots in which said coils are seated, at an axial end of the cavity defined between said slots, said exit port of said first gas passage being defined adjacent said vent passage, further comprising a ventilated block disposed intermediate said exit port and said vent passage for conducting cooling gas from said exit port to said vent slot and for substantially isolating said cooling gas from said cavity defined between said slots.

2. The cooling gas ventilation circuit of claim 1 wherein said inlet port of said first cooling passage is inclined to the respective turn longitudinal side face.

3. The cooling gas ventilation circuit of claim 1 wherein said inlet port of said second cooling passage is inclined to the respective turn longitudinal side face.

4. The cooling gas ventilation circuit of claim 1 wherein said exit port of said first cooling passage is inclined to the respective turn longitudinal side face.

5. The cooling gas ventilation circuit of claim 1 wherein said first cooling passage comprises a groove defined in a radially facing surface of said turn.

6. The cooling gas ventilation circuit of claim 5 wherein said groove is defined in the radially upper face of said turn.

7. The cooling gas ventilation circuit of claim 1 wherein said second cooling passage comprises a groove defined in a radially facing surface of said turn.

8. The cooling gas ventilation circuit of claim 7 wherein said groove is defined in the radially upper face of said turn.

9. The cooling gas ventilation circuit of claim 1, wherein said radial slots are circumferentially spaced on the periphery of the rotor on either side of a pole portion of the rotor body; wherein said pole portion has a centerline and further wherein said inlet port of said first gas passage is defined proximate the centerline of said pole portion.

10. A cooling gas ventilation circuit for an end winding of a rotary machine having a rotor, a plurality of radial slots provided in said rotor, a rotor tooth defined between adjacent pairs of said radial slots, and a plurality of coils respectively seated in said radial slots, said coils each comprising a plurality of radially stacked turns, said coils extending beyond a pole face of the rotor to form an end winding, cavities being defined between adjacent pairs of said coils, said ventilation circuit comprising:

a first cooling gas passage defined in at least one turn of a first said coil of said end winding, said first cooling gas passage extending from an inlet port on either longitudinal side of said turn to an exit port defined on a longitudinal side of said turn, said first cooling gas passage extending along at least a portion of the longitudinal extent of said turn;

a second cooling gas passage defined in at least one turn of said first coil of said end winding, said second cooling gas passage extending from an inlet port on said one longitudinal side of said turn to a radial chimney defined through a plurality of the turns of the first coil within said respective radial slot, said second passage being longitudinally offset with respect to said first cooling passage;

a third cooling gas passage defined in at least one turn of a second said coil of said end winding, disposed adjacent said first coil, said third cooling gas passage extending from an inlet port on either longitudinal side of said turn to an exit port defined on a longitudinal side of said turn, said third cooling gas passage extending along at least a portion of the longitudinal extent of said turn; and a fourth cooling gas passage defined in at least one turn of said second coil of said end winding, said fourth cooling gas passage extending from an inlet port on said one longitudinal side of said turn to a radial chimney defined through a plurality of the turns of the second coil within said respective radial slot, said fourth passage being longitudinally offset with respect to said third cooling passage, wherein said rotor is formed with a vent passage in the rotor tooth disposed between said first and second coils, extending from said pole face in an area of said rotor between said radial slots in which said first and second coils are seated, and the exit port of at least one of said first and third gas passages is defined adjacent said vent passage.

11. The cooling gas ventilation circuit of claim 10 further comprising a ventilated block body disposed intermediate said exit port and said vent passage for conducting cooling gas from said exit port to said vent passage and for substantially isolating said cooling gas from said cavity defined between said first and second coils.

12. The cooling gas ventilation circuit of claim 11 wherein said exit port is the exit port of said third gas passage and wherein said inlet port of said second gas passage is open to said cavity defined between said first and second coils.

13. The cooling gas ventilation circuit of claim 10 wherein the exit ports of both said first and third gas passages are defined adjacent said vent passage.

14. The cooling gas ventilation circuit of claim 13 further comprising a ventilated block disposed intermediate said exit ports and said vent passage for conducting cooling gas from both said exit ports to said vent passage and for substantially isolating said cooling gas from said cavity defined between said first and second coils.

15. The cooling gas ventilation circuit of claim 14 wherein said rotor is formed with a vent passage in the rotor tooth disposed between said first and second coils, extending from said pole face in an area of said rotor between said radial slots in which said first and second coils are seated, and further comprising a ventilated block for discharging gas from beneath the coils through a cavity formed by said vent passage in the tooth and said ventilated block.

16. The cooling gas ventilation circuit of claim 10 wherein said inlet port of said second passage and said inlet port of said fourth passage are open to the cavity defined between said first and second coils.

* * * * *